United States Patent [19]

Baldwin

[11] E Re. 28,681

[45] Reissued Jan. 13, 1976

[54] HIGH TEMPERATURE ALLOYS

[76] Inventor: James French Baldwin, Delray Beach, Fla.

[22] Filed: July 29, 1975

[21] Appl. No.: 598,111

Related U.S. Patent Documents

Reissue of:

[64] Patent No.: 3,869,284
Issued: Mar. 4, 1975
Appl. No.: 346,815
Filed: Apr. 2, 1973

[52] U.S. Cl. ..... 75/134 F; 75/171; 148/32.5
[51] Int. Cl.[2] ..... C22C 19/05
[58] Field of Search ..... 75/134 F, 170, 171; 148/32, 32.5

[56] References Cited

UNITED STATES PATENTS

| | | | |
|---|---|---|---|
| 2,975,051 | 3/1961 | Wilson et al. | 75/171 |
| 3,061,426 | 10/1962 | Bieber | 75/171 |
| 3,067,030 | 12/1962 | Dunn et al. | 75/171 |
| 3,164,465 | 1/1965 | Thielemann | 75/171 |
| 3,310,399 | 3/1967 | Baldwin | 75/171 |
| 3,486,887 | 12/1969 | Yoda et al. | 75/171 |

FOREIGN PATENTS OR APPLICATIONS

| | | |
|---|---|---|
| 863,912 | 3/1961 | United Kingdom |
| 1,013,347 | 12/1965 | United Kingdom |
| 1,034,603 | 6/1966 | United Kingdom |
| 1,268,844 | 3/1972 | United Kingdom |
| 1,302,160 | 1/1973 | United Kingdom |

OTHER PUBLICATIONS

F. F. Khimiushin, High Temperature Steels and Alloys, Metallurgiya, Pub. House, Moscow, (1969), FTD—HC—23-391, Parts I and II, (1971).

*Primary Examiner*—R. Dean
*Attorney, Agent, or Firm*—Finnegan, Henderson, Farabow & Garrett

[57] ABSTRACT

Nickel base superalloys in which critical amounts of boron are employed to enhance creep-rupture strength and ductility in the 1,300° F–1,800° F. temperature range. Creep-rupture strength and ductility at temperatures around 1,800° F. also is enhanced by employing amounts of carbon below a critical upper limit. These alloys are particularly useful in the form of castings as gas turbine engine components.

57 Claims, 7 Drawing Figures

HIGH TEMPERATURE ALLOYS

Matter enclosed in heavy brackets [ ] appears in the original patent but forms no part of this reissue specification; matter printed in italics indicates the additions made by reissue.

FIELD OF THE INVENTION

This invention relates to nickel-base alloys having relatively great tensile strength at high temperatures and to castings made from such alloys. The nickel-base superalloys of the present invention are particularly useful for fabricating components of gas turbine engines, such as turbine blades, turbine vanes, integral wheels, and the like.

BACKGROUND OF THE INVENTION

There are a number of precipitation strengthened nickel-base superalloys which, because of their strength at high temperatures, are used as materials in fabricating components for use in high temperature sections of gas turbines. The precipitate involved is an intermetallic compound, generally referred to as gamma prime, having the generic formula $Ni_3(Al, Ti)$. Alloys hardened by such precipitates are referred to as gamma prime strengthed superalloys. In recent years, while characteristics of such alloys at lower temperatures have not altogether been ignored, the greater emphasis in the development of improved alloys has been centered around performance at high temperatures. High temperature performance has been of concern because of the fact that in new engine designs, as gar turbine operating temperatures are increasing to meet the demands for higher efficiency and power output. High temperature performance properties of particular concern include stress-rupture and creep strength, resistance to thermal fatigue, and corrosion resistance.

It is known that thermal fatigue properties are associated with intermediate temperature (1,300°F – 1,500°F) ductility. The greater the ductility in this range, the more resistant the alloy is to thermal fatigue. As a general rule, alloys with high temperature rupture and creep strength have inadequate thermal fatigue and hot corrosion resistance. Conversely, alloys with good hot corrosion resistance show poor high temperature rupture, creep and thermal fatigue properties.

While much work has been done in the development of precipitation strengthened high temperature superalloys, no alloy has been found to be entirely satisfactory with respect to fulfilling the strength, ductility and thermal fatigue requirements needed in gas turbine components. Indeed, in recent superalloy developments, strength improvements obtained through composition modification generally have resulted in reduced ductility. In the same manner, alloys designed for improved ductility or toughness or hot corrosion resistance generally possess inadequate strength.

Superalloys suitable for fabircating gas turbine components desirably possess good creep-rupture strength, i.e., resist excessive creep or rupture for long periods of time while under stress at high temperatures. Such alloys also desirably possess good creep-rupture ductility, i.e., deform uniformly and predicatably while under stress at high temperataure, rather than crack and fracture. Alloys that lack ductility will tolerate little deformation before the onset of crack nucleation, rapid crack propagation, and failure. Use of a material lacking adequate ductility can result in unpredictable and catastrophic engine component failure. A characteristic peculiar to the gamma prime strengthened superalloys is that they are subject to a sharp decrease in creep-rupture ductility and tensile strength at temperatures between about 1,300°F. and 1,500°F. The decrease in ductility is commonly referred to as the "ductility trough," as ductility is higher at temperatures below 1,300°F. and above 1,500°F. It generally has been observed that the higher the strength of an alloy, the more pronounced will be the ductility decrease within the "ductility trough" temperature range. An example would be MAR-M200 (U.S. Pat. No. 3,164,465). This alloy possesses adequate strength for most advanced gas turbine engine requirements, but lack of 1,400°F. ductility in the conventionally cast material precludes its usefulness for turbine components.

To circumvent the low ductility problem while retaining usable high temperature strength, the art, in recent years, has turned to a casting process known as directional solidification. This technique, disclosed in U.S. Pat. No. 3,260,505, eliminates grain boundaries that lay in a direction transverse to the direction of applied stress in the component. While directional solidification eliminates a major cause of low longitudinal creep-rupture ductility, it is an expensive procedure and is therefore used only in specialized cases where cost is not a major concern.

It has also been attempted to circumvent ductility trough problems by introducing hafnium to nickel-base superalloys (see, e.g., U.S. Pat. Nos. 3,005,705; 3,677,746; 3,677,746; 3,677,747; and 3,677,748). The addition of very dense and expensive hafnium imposes higher raw material costs and increases the unit weight of the alloys. Increased weight, of course, is a serious disadvantage in alloys intended for aircraft engine components. As is apparent, the lack of the combination of high temperature creep-rupture strength and ductility remains a major inadequacy in existing superalloy compositions. These inadequacies are particularly acute since they impair the usefulness of superalloys for many of their intended applications, i.e., formation of gas turbine components.

The alloys of the present invention have improved high temperature strength and corrosion resistance. These alloys are capable of withstanding prolonged operation at temperatures up to about 2,000°F. or higher, and may be formed into highly advantageous castings.

In accordance with the present invention, alloy compositions have been discovered which possess unique and unusually high creep-rupture strength and ductility in the polycrystalline (non-directionally solidified) form. Specifically, a previously unrecognized criticality has been discovered in the amounts of two alloying elements (boron and carbon) included in chromium, aluminum, and titanium containing nickel base superalloy compositions.

The desirability of adding boron and carbon to high temperature alloys is well documented in the prior art technical and patent literature. The alloy characteristics generally enhanced by the addition of some boron and carbon include ductility, strength, forgeability and in some cases, castability. The present level of technology in the field of superalloy physical metallurgy does not enable precise definition or explanation of the exact mechanism responsible for this property enhancement. Yet one versed in the art of superalloy development recognizes the necessity for the presence of both elements.

While it is known that the role of both carbon and boron in nickel superalloys is complex and dynamic, some generalizations can be drawn. Carbon appears in the form of complex carbides which prefer grain boundaries as location sites. Detrimental effects on ductility have been noted with certain grain boundary carbide morphologies. This indicates that carbon should be maintained at low levels. On the other hand, it also has been observed that low carbon content results in sharply reduced high temperature creep life. It is generally believed, since carbides exert a significant and beneficial effect on rupture strength at high temperature, that carbon should be part of superalloy composition.

Boron is considered an essential ingredient in superalloys. In superalloys, boron in the form of complex borides, is also located at grain boundaries. Grain boundary morphology of superalloys is significant because high temperature creep and rupture failures initiate at and propogate along grain boundaries. Complex borides at grain boundaries reduce the onset of grain boundary tearing under rupture loading.

Typical cast superalloys of the prior art preferably contain carbon in an amount of about 0.10% to about 0.25% by weight. In typical prior art wrought alloys, the carbon content range is between about 0.03% and about 0.15% by weight. For example, in a commercial alloy known as INCO 713, the carbon content is kept as low as 0.05% by weight. Boron content in over fifty prior art alloys studied, preferably is held between 0.007% and 0.03% by weight of the composition. The very small amount of boron used in these commercial alloys demonstrates the potency of the element in affecting properties.

The present invention is based, in part, on the discovery of an unusual and unexpected improvement, in both 1,400°F. creep-rupture strength and ductility of gamma prime strengthened nickel-base superalloys, obtained by increasing boron content up to about twenty times the accepted optimum level. Maintenance of the boron content within this critical range of the present invention not only eliminates the problem discussed earlier, relating to the ductility trough present at temperatures between about 1,300°F. and 1,500°F., but results in a marked increase in creep-rupture strength at those temperatures.

It has also been discovered, in accordance with the present invention, that by reducing the carbon content to a critical upper limit below the amount generally employed in superalloys, it is possible to both effect the improvement in 1,400° F. properties and maintain or improve creep-rupture strength and ductility at temperatures around 1,800° F. This aspect of the present invention is important with respect to items such as gas turbine components requiring enhanced properties at both 1,400° F. and 1,800° F.

Among the alloys of the prior art which will exhibit enhanced properties by following the teachings of the present invention are those disclosed in U.S. Pat. Nos. 3,310,399; 3,164,465; 3,061,426; and 3,619,182. While many of the alloy compositions disclosed in these patents are similar to, and generically overlap with, the alloys of the present invention, none of these patents disclose, nor do corresponding commercial alloy have, the unusual and surprisingly advantageous properties and characteristics of the alloys of the present invention. This is because the prior art fails to recognize the critical carbon and boron content ranges of the alloys of the present invention. All of the commercial alloys derived from the patents referred to above contain substantially less than the minimum boron content used in the alloys of the present invention. Additionally, while at least some of these patents suggest broad boron content ranges which overlap the boron content range of the present invention, there is no recognition that high temperature properties will maximize in a narrow range within these broadly disclosed ranges.

The alloys of the present invention, which have very good stress rupture life at elevated temperatures, contain required minimum amounts of nickel, chromium, aluminum and titanium. The chromium affords primary corrosion resistance while the remaining components are essential to the formation of the gamma prime intermetallic compound. $Ni_3(Al, Ti)$, which forms the basic superalloy structure of this invention. The $Ni_3(Al, Ti)$ precipitate lends to these alloys their required high temperature strength, and titanium is an important element in providing the strength properties of the present alloys at both room temperature and at elevated temperatures. The presence of significant amounts of Ti strengthener in the present alloys renders them significantly different in character from lower temperature alloys such as those of U.S. Pat. No. 3,005,704, which excludes Ti from its alloys.

SUMMARY OF THE INVENTION

In general terms, the present invention pertains to gamma prime phase strengthened superalloys. These alloys are specifically adapted to be employed in cast shapes under conditions of high stress at high temperature. The invention also concerns cast components for use in gas turbine engines made from such alloys.

The alloys of the present invention are predominantly nickel, i.e., at least 35% nickel, and contain in varying amounts, chromium, aluminum, titanium, and boron. One or more of the elements carbon, cobalt, zirconium, molybdenum, tantalum, rhenium, columbium, vanadium, and tungsten may also be included in these alloys. In addition, the alloys of the present invention may contain minor amounts of other elements ordinarily included in superalloys by those skilled in the art which will not substantially deleteriously effect the important characteristics of the alloy or which are inadvertently included in such alloys by virtue of impurity levels in commercial grades of alloying ingredients.

It is a principal object of the present invention to include in the aforedescribed alloys amounts of boron within the range of 0.05% to 0.3% by weight to enhance creep-rupture strength and ductility at temperatures around 1,400° F. In accordance with preferred embodiments of the present invention, in addition to maintaining the boron content within the range specified, the carbon content of the alloys is maintained below about 0.05% by weight. By additionally maintaining the carbon content below this critical upper limit, it is possible to effect creep-rupture strength and ductility improvement at temperatures around 1,400°F. while, at the same time, maintaining or improving creep-rupture strength and ductility at temperatures around 1,800° F.

Table I sets forth a broad range and two different narrower ranges, in terms of percent by weight, of elements employed in the alloys of the present invention. It should be understood that the tabulation in Table I relates to each element individually and is not intended to solely define composite of broad and narrow ranges. Nevertheless, composites of the narrower ranges specified in Table I represent preferred embodiments.

A particularly preferred alloy composition, in percentages by weight, consists essentially of about 8.0% to about 10.25% chromium, about 4.75 to about 5.5% aluminum, about 1.0% to about 2.5% titanium, about 0.05 to about 0.30% (and more preferably about 0.075% to about 0.2%) boron, up to about 0.17% (and more preferably less than 0.05%) carbon, about 8% to about 12% cobalt, about 0.75% to about 1.8% columbium, about 11% to about 16% tungsten, up to 0.20% zirconium, and the balance essentially nickel and minor amounts of impurities and incidental elements which do not detrimentally affect the basic characteristics of the alloy.

TABLE I

| ELEMENT | BROAD RANGE | NARROWER RANGES | | | |
|---|---|---|---|---|---|
| Cr | 5.0 - 22 | 6.0 | - 17 | 5 | - 12 |
| Al | 0.2 - 8 | 2 | - 8 | 4 | - 8 |
| Ti | 0.5 - 7 | 0.75 | - 3 | 0.75 | - 2.5 |
| B | 0.05 - 0.30 | 0.07 | - 0.25 | 0.075 | - 0.20 |
| C | 0.00 - 0.35 | | <0.05 | | <0.05 |
| Co | 0.00 - 20 | 2 | - 17 | 5 | - 15.5 |
| Cb | 0.00 - 3 | 0.25 | - 3 | | <0.20 |
| Mo | 0.00 - 8 | | <3 | 3 | - 8 |
| Ta | 0.00 - 10 | | <3 | 2.3 | - 10 |
| V | 0.00 - 2 | — | | — | |
| W | 0.00 - 20 | 5 | - 20 | | <2.5 |
| Zr | 0.00 - 1.00 | 0.001 | - 0.5 | | <1 |
| Re | 0.00 - 2 | — | | — | |
| Ni | 35 - 85 | 40 | - 80 | 40 | - 80 |

Another particularly preferred alloy composition, in percentages by weight, consists essentially of about 7.5% to about 8.5% chromium, about 5.75% to 6.25% aluminum, about 0.8% to about 1.2% titanium, about 0.05% to about 0.30% (and more preferably about 0.075% to about 0.2%) boron, up to about 0.13% (and more preferably less than 0.05%) carbon, about 9.5% to about 10.5% cobalt, about 5.75% to about 6.25% molbdenum, about 4.0% to about 4.5% tantalum, 0.05% to 0.10% zirconium, and the balance essentially nickel and minor amounts of impurities and incidental elements which do not detrimentally affect the basic characteristics of the alloy.

Impurities and incidental elements which may be present in the alloys of the present invention include manganese, copper, and silicon in amounts of not more than 0.50%, sulfur and phosphorus in amounts of not more than 0.20%, and iron in amounts of not more than 2.0%. Impurities such as nitrogen, hydrogen, tin, lead, bismuth, calcium, and magnesium should be held to as low a concentration as practical.

DESCRIPTION OF EXAMPLES AND PREFERRED EMBODIMENTS

Figure 1:
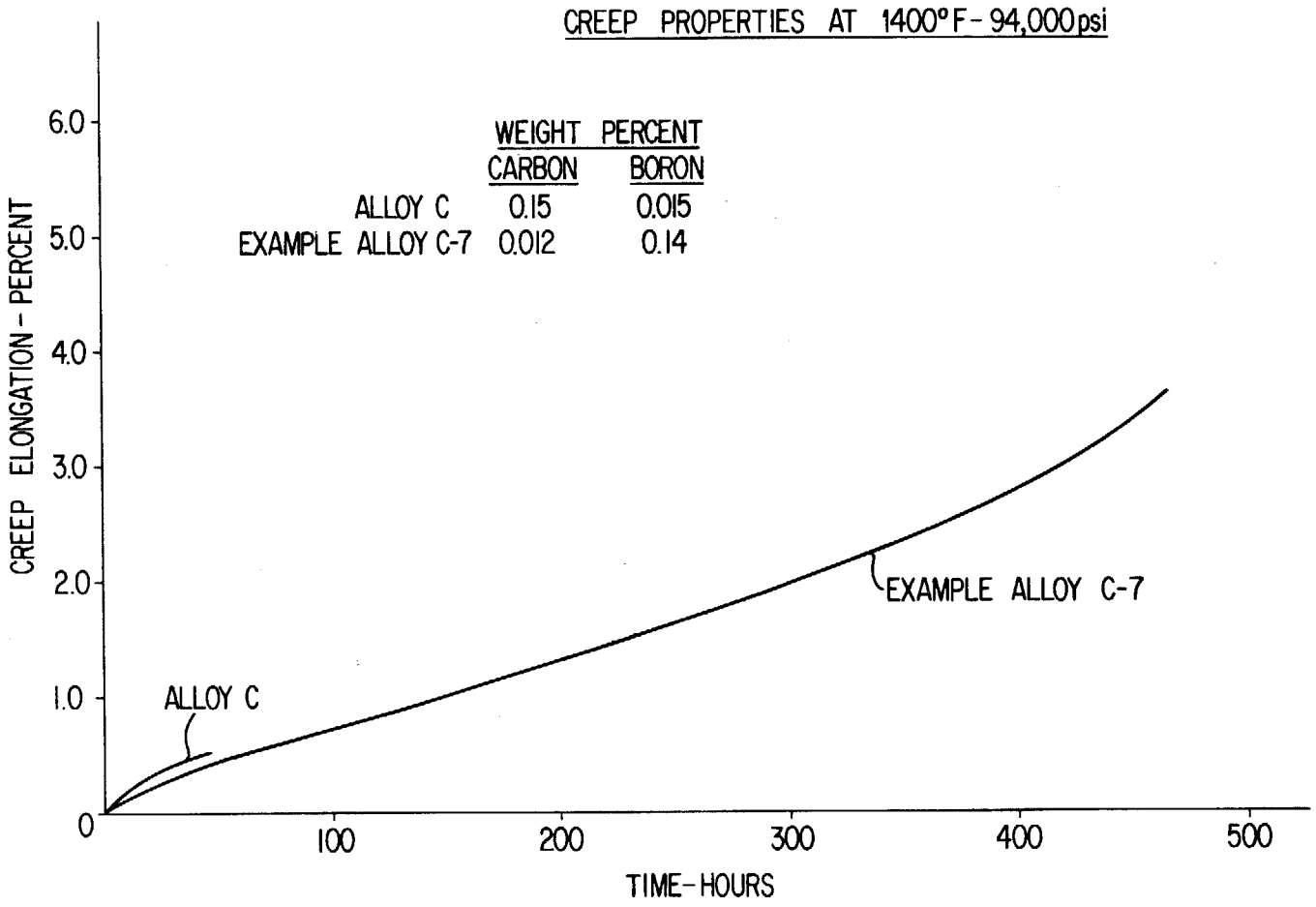
FIG. 1 is a graphical plot of percent creep elongation against time for two alloys, one within the ambit of the present invention, and the other outside the ambit of the present invention.

The alloys of the present invention, containing boron within the critical range of 0.05% to 0.3% by weight, exhibit enhanced creep rupture strength and ductility in the 1,300° F. to 1,500° F. temperature range over prior art gamma prime strengthened nickel base superalloys. Thus the alloys of the present invention are capable of withstanding an applied stress of 94,000 psi at 1,400°F without rupture for a time in excess of 120 hours. Further, this improvement in strength and ductility properties in the intermediate temperature range (1,300°F. - 1,500°F) is accompanied by a pronounced beneficial effect on high temperatue (above 1,700°F.) thermal fatigue properties. Alloys of the present invention, having improved intermediate temperature strength and ductility, demonstrate great advantage in resistance to high temperature thermal fatigue cracking over alloys containing boron in amounts outside the critical range of the present invention.

Designers of gas turbine engines place great importance upon the selection of capable and reliable materials. This is particularly true for rotating components in large aircraft engines where unpredictable engine component failure could endanger the aircraft and its occupants. One of the more critical components in this calss of engines is the hot section or turbine blade. Because of the severe conditions of temperature and stress to which these components are subjected, they must be formed of high strength superalloys.

Usual designs involve the mechanical attachment of turbine blades around the periphery of a wheel or disk which rotates at high speed. In operation, hot gases pass over the airfoil portion of the blades, causing the blades and disk to rotate at high speed. The hot gases raise the metal temperatures and the high rotational speed of the disk imposes stress due to centrifugal loading. The attachment, or root portion of the blade is heated only to moderate temperatures due to the cooling effect of the massive disk. The temperature to which the root section of the blade is heated is frequently in the ductility trough temperature range (1,300° F. to 1,500° F.). It is an essential mechanical property of an alloy being used for such blades that it be capable of deforming predictably in the root section at temperatures around 1,400° F. while withstanding mechanically imposed strain without cracking, i.e., the alloy must possess reasonable ductility. The alloys of the present invention, containing boron within the critical range of 0.05% to 0.30% by weight, demonstrate great advantage in strength and ductility in the 1,400° F. temperature range over prior art alloys intended for use in turbine blades.

The rotating turbine disk, to which the blade root is attached, also requires high resistance to creep and rupture along with ductility and strength to resist fatigue and crack propagation. Accordingly, the alloys described herein provide enhanced properties desirable in disk alloys.

Manufacturers of small gas turbine engines generally employ an integral wheel rather than an assembly of individual disks and blades. These integral wheels, consisting of a single component comprising a disk having radially extending blade airfoils at the disk periphery, is usually manufactured by investment casting. Normal modes of operation for small engines subject such components to rapid heating and cooling. This normal mode of operation results in premature cracking at the disk rim between the blade airfoils, because of low cycle thermal and mechanical fatigue. Since the disk rin in many engine designs operates up to about 1,400° F., the alloys of the present invention enhance the overall performance of integral wheels.

The formulations of several of the more important prior art alloys which are currently commercially used in turbine engines are tabulated in Table II. The values tabulated represent the amount of each ingredient present in terms of weight percent. The amount of boron and carbon present in each formulation is considered by the prior art to be approximately optimum. With respect to each of the alloys, designated A, B, C, D, E, and F, the U.S. Patent and commercial designation is indicated in the table.

For purposes of comparison, example alloys, compositionally similar to the commercial alloys of Table II, but containing boron within the critical range of the present invention, were prepared. Analyses of these example alloys (designated A-1, B-1, etc.) are presented in Table III. Standard cast-to-size test bars (0.25 inch in diameter) of the alloys of Table II and the example alloys of Table III were prepared by melting and casting under vacuum into shell molds. All example alloy specimens were heat treated under a protective atmosphere at 1,975° F. for four hours and then air cooled. The example alloys were also subjected to an aging heat treatment at 1,650° F. for ten hours. Each of the commercial alloys of Table II was heat treated in accordance with the practice recommended by the alloy developer.

Table IV shows the comparative creep-rupture strength (as measured by time to rupture) and ductility, (as measured by prior creep) of both commercial alloys A, B, C, and E, and example alloys A-1, B-1, C-1, C-2, C-3 and E-1. All alloys were tested at 1,400° F. under a stress of 94,000 psi.

The data in Table IV shows a very significant improvement in both 1,400° F. creep-rupture strength and ductility for alloys having a boron content within the critical range of the present invention. At 0.20 weight percent boron, the properties of Example C-3, although decreasing from Example C-2, still show a marked improvement over Alloy C.

The data set forth in Tables II – IV demonstrates that the utility of nickel-base superalloys for use in gas turbine engine components in which maximum service temperature does not exceed about 1,400° F. is greatly enhanced by increasing boron content to an effective level previously considered excessive.

TABLE II

| | A* | B* | C* | D* | E* | F* |
|---|---|---|---|---|---|---|
| C | 0.10 | 0.10 | 0.15 | 0.15 | 0.18 | 0.21 |
| Cr | 8.0 | 10.0 | 9.0 | 9.0 | 10.0 | 12.5 |
| Co | 10.0 | 10.0 | 10.0 | 10.0 | 15.0 | 9.0 |
| W | — | — | 12.5 | 10.0 | — | 3.9 |
| o | 6.0 | 3.0 | — | 2.5 | 3.0 | 2.0 |
| Ta | 4.25 | 7.0 | — | 1.5 | — | 3.9 |
| Ti | 1.0 | 1.0 | 2.0 | 1.5 | 4.7 | 4.2 |
| Al | 6.0 | 6.0 | 5.0 | 5.5 | 5.5 | 3.2 |
| B | 0.015 | 0.015 | 0.015 | 0.015 | 0.015 | 0.02 |
| Zr | 0.10 | 0.10 | 0.05 | 0.05 | 0.06 | 0.10 |
| Cb | — | — | 1.0 | — | — | — |
| V | — | — | — | — | 1.0 | — |
| Ni | (1) | (1) | (1) | (1) | (1) | (1) |

A* 3,310,399 B-1900
B* 3,310,399 B-1910
C* 3,164,465 MAR-M200
D* 3,164,465 MAR-M246
E* 3,061,426 IN-100
F* 3,619,182 IN-792
(1)Balance

TABLE III

| | EXAMPLE NO. | | | | | |
|---|---|---|---|---|---|---|
| | A-1 | B-1 | C-1 | C-2 | C-3 | E-1 |
| C | 0.12 | 0.11 | 0.15 | 0.09 | 0.15 | 0.18 |
| Cr | 7.87 | 10.2 | 8.75 | 9.30 | 8.75 | 10.1 |
| Co | 10.15 | 10.0 | 10.1 | 10.3 | 10.1 | 15.1 |
| W | — | — | 12.0 | 12.81 | 12.0 | — |
| Mo | 6.06 | 3.05 | — | — | — | 3.01 |
| Ta | 4.40 | 6.75 | — | — | — | — |
| Ti | 1.08 | 1.12 | 1.98 | 2.08 | 1.98 | 4.80 |
| Al | 5.95 | 6.30 | 4.99 | 4.80 | 4.99 | 5.33 |
| B | 0.10 | 0.10 | 0.10 | 0.13 | 0.20 | 0.10 |
| Zr | 0.05 | 0.14 | 0.06 | 0.03 | 0.06 | 0.06 |
| Cb | — | — | 1.23 | 1.20 | 1.23 | — |
| V | — | — | — | — | — | 0.86 |
| Ni | (1) | (1) | (1) | (1) | (1) | (1) |

(1)Balance

TABLE IV

| | Boron Content (wt. %) | Creep-Rupture Properties 1400F/94,000 psi Rupture Life (hr) | Prior Creep[1](%) |
|---|---|---|---|
| Alloy A | 0.016 | 31.0 | 1.98 |
| Example No.: | | | |
| A-1 | 0.10 | 229.6 | 6.80 |
| Alloy B | 0.015 | 102.1 | 3.68 |
| Example No.: | | | |
| B-1 | 0.10 | 297.2 | 8.95 |
| Alloy C | 0.015 | 46.7 | 0.51 |
| Example No.: | | | |
| C-1 | 0.10 | 400.6 | 3.60 |
| C-2 | 0.13 | 442.6 | 6.45 |
| C-3 | 0.20 | 245.5 | 2.35 |
| Alloy E | 0.012 | 26.6 | 0.96 |
| Example No.: | | | |
| F-1 | 0.10 | 345.0 | 5.25 |

[1]Prior creep indicates the last-creep reading prior to specimen failure

The need for improved higher temperature (greater than 1,700°F) creep capability in gas turbine alloys is of comparable importance to effecting an improvement in 1,400° F. creep-rupture strength and ductility. Therefore, the effect of the high boron range upon the creep-rupture properties in the 1,700° F. to 1,900°F. temperature range was studied by conducting creep-rupture tests on heat treated standard cast-to-size test bars at 1,800° F. under a stress of 29,000 psi.

Results of that testing show that the high boron levels, demonstrated as being unusually effective for 1,400° F. properties, were deleterious to 1,800° F. rupture strength. The effect was a weakening of the resistance of all alloys in Tabe II to creep deformation and a noticeable increase in ductility, i.e., a weaker but more ductile material. For gas turbine components requiring both 1,400° F. and 1,800° F. creep-rupture strength and ductility, use of the alloys shown in Table II would involve the unacceptable tradeoff of improved 1,400° F. ductility at the expense of decreased 1,800° F. strength.

It has been discovered, in further accord with the present invention, that by reducing the carbon content to a critical upper limit of no more than about 0.05 weight percent, it is possible to both effect the improvement in 1,400° F. properties and approximately maintain, and in some cases improve, creep-rupture strength and ductility at 1,800° F. Alloys of the present invention, containing less than 0.05 weight percent carbon are capable of withstanding an applied stress of 29,000 psi at 1,800° F. without rupture for a time in excess of 40 hours.

The low carbon aspect of the present invention is particularly important with respect to turbine components requiring enhanced properties at both 1,400° F. and 1,800° F. As previously noted, properties at around 1,400° F. are particularly important with respect to the root sections of turbine blades. However, the hot gases passing across the airfoil portion of the blade raise metal temperatures into the 1,700° F. to 1,900° F. temperature range. Accordingly, turbine blades desirably require an alloy having good high temperature properties throughout the temperature range of from about 1,300° F. to about 1,900° F. or higher.

To demonstrate the utility and advantages of the low carbon feature of the present invention, thirty pound heats of example alloys A-2, B-2, C-4 through 13, D-1, E-2 through 9, and F-1 were prepared by melting under vacuum. Standard test bars (0.25 inch diameter) were cast under vacuum into shell molds and all specimens were heat treated under a protective atmosphere at 1,975° F. for four hours. After air cooling, all specimens were subjected to an aging heat treatment of 1,650° F. for ten hours. Analyses for series A,B,D, and F example alloys are shown in Table V. Analyses for series C and E example alloys are shown, respectively, in Tables IV and VII. In all six series compositions, carbon has been reduced to as low a level as possible using normal master alloys and metals in the preparation of each heat. Such a technique is representative of typical commercial practice. Intentional carbon was added however, where appropriate, to determinate the critical upper limit.

Creep-rupture tests were conducted at 1,800° F. under a stress of 29,000 psi and at 1,400° F. under a stress of 94,000 psi on all low carbon example alloys. For comparative purposes, the same tests were conducted on the commercial alloys A,B,C,D,E, and F of Table II. The commercial alloy test bars were heat treated in accordance with the procedures recommended by the producers to achieve maximum mechanical properties. Creep-rupture data for commercial alloys D and F under these conditions were obtained from technical literature provided by the respective alloy producers.

The data of Table VII demonstrates the applicability of the present invention to a wide range of superalloys. The four example alloys corresponding to the four commercial alloys designated A,B,D, and F had boron and carbon levels approaching the target compositions, i.e., 0.01 weight percent carbon and 0.10 to 0.12 weight percent boron. The comparative test results between the commercial alloys A, B, D, and F and corresponding series A, B, D and F example alloys set forth in Table VIII shows in all cases that very significant improvements are effected at both 1,400° F. and 1,800° F in rupture life and ductility.

TABLE V

| EXAMPLE NO. | A-2 | B-2 | D-1 | F-1 |
|---|---|---|---|---|
| C | 0.014 | 0.040 | 0.009 | 0.009 |
| Cr | 9.75 | 10.56 | 9.66 | 11.35 |
| Co | 12.15 | 11.76 | 10.91 | 9.43 |
| W | — | — | 9.66 | 4.18 |
| Mo | 5.89 | 3.10 | 2.43 | 2.04 |
| Ta | 3.71 | 5.70 | 1.50 | 4.23 |
| Ti | 0.96 | 0.99 | 1.38 | 3.69 |
| Al | 5.95 | 6.03 | 5.19 | 3.92 |
| B | 0.081 | 0.109 | 0.084 | 0.096 |
| Zr | 0.073 | 0.084 | 0.062 | 0.083 |
| Ni | (1) | (1) | (1) | (1) |

(1)Balance

TABLE VI

| | EXAMPLE NO. | | | | | | | | | |
|---|---|---|---|---|---|---|---|---|---|---|
| | C-4 | C-5 | C-6 | C-7 | C-8 | C-9 | C-10 | C-11 | C-12 | C-13 |
| C | 0.011 | 0.010 | 0.014 | 0.012 | 0.011 | 0.018 | 0.018 | 0.045 | 0.023 | 0.033 |
| Cr | 9.33 | 8.33 | 8.89 | 8.61 | 8.64 | 8.97 | 8.96 | 9.50 | 9.54 | 10.00 |
| Co | 10.66 | 10.70 | 10.64 | 10.66 | 10.71 | 10.78 | 10.60 | 10.50 | 10.69 | 10.54 |
| W | 12.41 | 12.40 | 12.74 | 12.84 | 12.48 | 12.55 | 12.41 | 12.5 | 11.84 | 13.15 |
| Ti | 1.76 | 1.78 | 1.77 | 1.78 | 1.75 | 1.77 | 1.76 | 2.0 | 1.75 | 1.75 |
| Al | 5.65 | 5.53 | 5.63 | 5.80 | 5.41 | 5.13 | 5.15 | 4.98 | 4.76 | 4.76 |
| B | 0.02 | 0.03 | 0.08 | 0.14 | 0.15 | 0.20 | 0.235 | 0.10 | 0.28 | 0.39 |
| Zr | 0.077 | 0.075 | 0.079 | 0.068 | 0.074 | 0.065 | 0.054 | 0.060 | 0.053 | 0.038 |
| Cb | 0.95 | 0.95 | 0.92 | 0.92 | 0.92 | 0.91 | 0.85 | 1.09 | 0.88 | 0.79 |
| Ni | (1) | (1) | (1) | (1) | (1) | (1) | (1) | (1) | (1) | (1) |

(1)Balance

TABLE VII

| | EXAMPLE NO. | | | | | | | |
|---|---|---|---|---|---|---|---|---|
| | E-2 | E-3 | E-4 | E-5 | E-6 | E-7 | E-8 | E-9 |
| C | 0.010 | 0.008 | 0.008 | 0.008 | 0.010 | 0.011 | 0.012 | 0.012 |
| Cr | 8.56 | 9.10 | 8.95 | 9.67 | 9.87 | 9.87 | 10.22 | 10.05 |
| Co | 16.60 | 16.67 | 16.62 | 16.62 | 16.62 | 16.86 | 16.80 | 16.69 |
| Mo | 3.01 | 2.94 | 3.17 | 3.06 | 3.03 | 3.25 | 3.33 | 3.32 |
| Ti | 4.89 | 4.90 | 4.88 | 4.74 | 4.91 | 4.64 | 4.64 | 4.56 |
| Al | 5.58 | 5.71 | 5.60 | 5.61 | 5.63 | 5.22 | 5.23 | 5.23 |
| B | 0.018 | 0.044 | 0.088 | 0.090 | 0.125 | 0.170 | 0.180 | 0.220 |
| Zr | 0.079 | 0.067 | 0.074 | 0.071 | 0.060 | 0.067 | 0.069 | 0.064 |
| V | 1.06 | 1.07 | 1.07 | 1.08 | 1.06 | 0.996 | 1.01 | 1.01 |
| Ni | (1) | (1) | (1) | (1) | (1) | (1) | (1) | (1) |

(1)Balance

TABLE VIII

| | | | Creep-Rupture Properties | | | |
|---|---|---|---|---|---|---|
| | | | 1400F/94,000psi | | 1800F/29,000psi | |
| | Boron (wt.%) | Carbon (wt.%) | Life (hr.) | Prior Creep(%) | Life (hr.) | Final Elong(%) |
| Alloy A | 0.016 | 0.12 | 31.0 | 1.98 | 53.2 | 6.0 |
| Example No.: A-2 | 0.081 | 0.014 | 146.5 | 7.3 | 44.8 | 9.9 |
| Alloy B | 0.010 | 0.11 | 102.1 | 3.68 | 50.3 | 9.3 |
| Example No.: B-2 | 0.109 | 0.040 | 206.0 | 5.1 | 52.4 | 13.0 |
| Alloy D | 0.015 | 0.15 | 120.0 | 2.2 | 50.0 | 5.0 |
| Example No.: D-1 | 0.084 | 0.009 | 432.8 | 4.3 | 58.1 | 4.8 |
| Alloy F | 0.02 | 0.21 | 62.0 | 3.5 | 30.0 | 11.0 |
| Example No.: F-1 | 0.096 | 0.009 | 254.4 | 8.1 | 79.2 | 11.7 |

The most pronounced effect noted is with alloy F in which 1,400° F. rupture life is increased by more than a factor of four, while ductility is doubled. At 1,800° F. the time to rupture is more than doubled, an unusually large increase.

Comparative results of the testing between alloy C and the respective Series C example alloys is shown in Table IX. The 1,400° F. results show strength comparable to the previous high carbon alloy rsults set forth in Table IV. This demonstrates that the boron is effective in improving 1,400° F. properties regardless of carbon level. The 1,800° F. results show creep-rupture life increasing with increasing boron to about 0.15 weight percent. Above 0.15 weight percent boron, strength falls off slightly. Example alloy C-4 shows very good rupture life at 1,400° F., but the low level of both boron and carbon causes low ductility in the 1,800° F. test. In addition, the combination of low boron and low carbon contents causes poor castability and a tendency for castings to crack on cooldown during solidification. The minimum boron required to circumvent these problems in the low carbon alloys is about 0.05 weight percent.

Comparative results of testing between alloy E and the respective Series E example alloys is shown in Table X. In these data it is seen that although the 1,400° F. strength is below the high carbon counterparts reported in Table IV, the improvement over commercial alloy E is significant.

TABLE IX

| | Boron (wt.%) | Carbon (wt.%) | Creep-Rupture Properties 1400F/94,000psi Life (hr.) | Prior Creep(%) | 1800F/29,000psi Life (hr.) | Final Elong.(%) |
|---|---|---|---|---|---|---|
| Alloy C | 0.015 | 0.15 | 46.7 | 0.51 | 96.8 | 7.5 |
| Example No.: | | | | | | |
| C-4 | 0.02 | 0.011 | 314.8 | 3.50 | 73.6 | 2.2 |
| C-5 | 0.03 | 0.010 | 392.2 | 2.57 | 85.2 | 2.4 |
| C-6 | 0.08 | 0.014 | 448.0 | 2.36 | 113.9 | 4.2 |
| C-7 | 0.14 | 0.012 | 452.9 | 3.53 | 122.4 | 6.0 |
| C-8 | 0.15 | 0.011 | 468.6 | 2.21 | 128.3 | 5.8 |
| C-9 | 0.20 | 0.018 | 459.8 | 2.03 | 117.1 | 4.5 |
| C-10 | 0.235 | 0.018 | 458.6 | 1.57 | 64.8 | 4.2 |
| C-11 | 0.10 | 0.045 | 397.2 | 2.59 | 92.3 | 7.0 |
| C-12 | 0.28 | 0.023 | 347.4 | 2.11 | 43.0 | 4.6 |
| C-13 | 0.39 | 0.033 | 80.7 | 1.56 | 14.7 | 11.1 |

TABLE X

| | Boron (wt.%) | Carbon (wt.%) | Creep-Rupture Properties 1400F/94,000psi Life (hr.) | Prior Creep(%) | 1800F/29,000psi Life (hr.) | Final Elong.(%) |
|---|---|---|---|---|---|---|
| Alloy E | 0.015 | 0.18 | 26.6 | 0.95 | 41.9 | 8.5 |
| Example No.: | | | | | | |
| E-2 | 0.018 | 0.010 | 38.6 | 2.32 | 27.0 | 5.2 |
| E-3 | 0.044 | 0.008 | 68.1 | 5.44 | 48.6 | 11.4 |
| E-4 | 0.088 | 0.008 | 104.2 | 5.92 | 41.3 | 12.3 |
| E-5 | 0.090 | 0.008 | 117.2 | 5.91 | 38.1 | 11.7 |
| E-6 | 0.125 | 0.010 | 174.1 | 4.86 | 41.2 | 13.8 |
| E-7 | 0.170 | 0.011 | 266.3 | 5.03 | 36.5 | 11.9 |
| E-8 | 0.180 | 0.012 | 302.2 | 4.90 | 31.9 | 10.1 |
| E-9 | 0.220 | 0.012 | 357.6 | 5.50 | 27.6 | 11.8 |

In addition, the 1,800° F. properties are maintained within a boron range of about 0.05 to 0.15 weight percent. At 0.22 weight percent boron in Example alloy E-9, the 1,800° F. strength is about sixty percent that of commercial alloy E.

The creep-rupture data discussed previously and presented in Tables IV, V, VIII, IX and X were developed using standard cast-to-size test bars with a 0.250 inch diameter gage section. To demonstrate that the property enhancement is applicable to turbine components, several turbine blade castings were produced from alloy C-7 and specimens cut from those castings. Testing was conducted under the same temperature and stress conditions previously employed and results are present in Table XI. The data show the expected reduction in capability compared to test bar properties, but the level of strength and ductility are exceptionally attractive for specimens machined from turbine component castings.

Another major concern of gas turbine engine builders in the selection of high temperature materials is the ability of the selected alloy to retain initial or starting properties after long time, high temperature exposure. Example Alloy C-7 cast-to-size test bars were subjected to creep testing at 1,500°F under a stress of 40,000 psi for 1,000 hours and examined microstructurally. No deleterious phase formation was observed and subsequent creep-rupture testing was conducted at 1,400°F and 94,000 psi for comparison with the same alloy in the as-heat treated condition.

TABLE XI

| Specimen No. | Creep-Rupture Properties 1400F/94,000psi Life (hr.) | Prior Creep(%) | 1800F/29,000psi Life (hr.) | Final Elong.(%) |
|---|---|---|---|---|
| 1 | 371.9 | 4.36 | 42.5 | 4.5 |
| 2 | 264.4 | 3.38 | 63.3 | 7.1 |
| 3 | 172.4 | 2.00 | 54.4 | 5.1 |

TABLE XI-continued

| Specimen No. | Creep-Rupture Properties 1400F/94,000psi Life (hr.) | Prior Creep(%) | 1800F/29,000psi Life (hr.) | Final Elong.(%) |
|---|---|---|---|---|
| 4 | 281.5 | 3.50 | 39.6 | 11.4 |
| 5 | | | 49.4 | 7.2 |
| b | | | 46.1 | 11.5 |

TABLE XII

| Example No. | Specimen Condition | Creep-Rupture Properties 1400F/94,000psi Life (hr.) | Prior Creep(%) |
|---|---|---|---|
| C-7 | As-heat treated | 452.9 | 3.53 |
| C-7 | Heat treated plus 1500F exposure for 1000 hours under stress of 40,000psi | 463.3 | 4.03 |

Results shown in Table XII reveal essentially no change in rupture life and an improvement in 1,400°F ductility.

FIG. 1 shows the creep characteristics of typical Alloy C and one of the example alloy C-7 test bars in the 1,400°F test. In FIG. 1, percent creep elongation is plotted against time. The improved results obtained with the alloys of the present invention are dramatically demonstrated.

Figure 2:
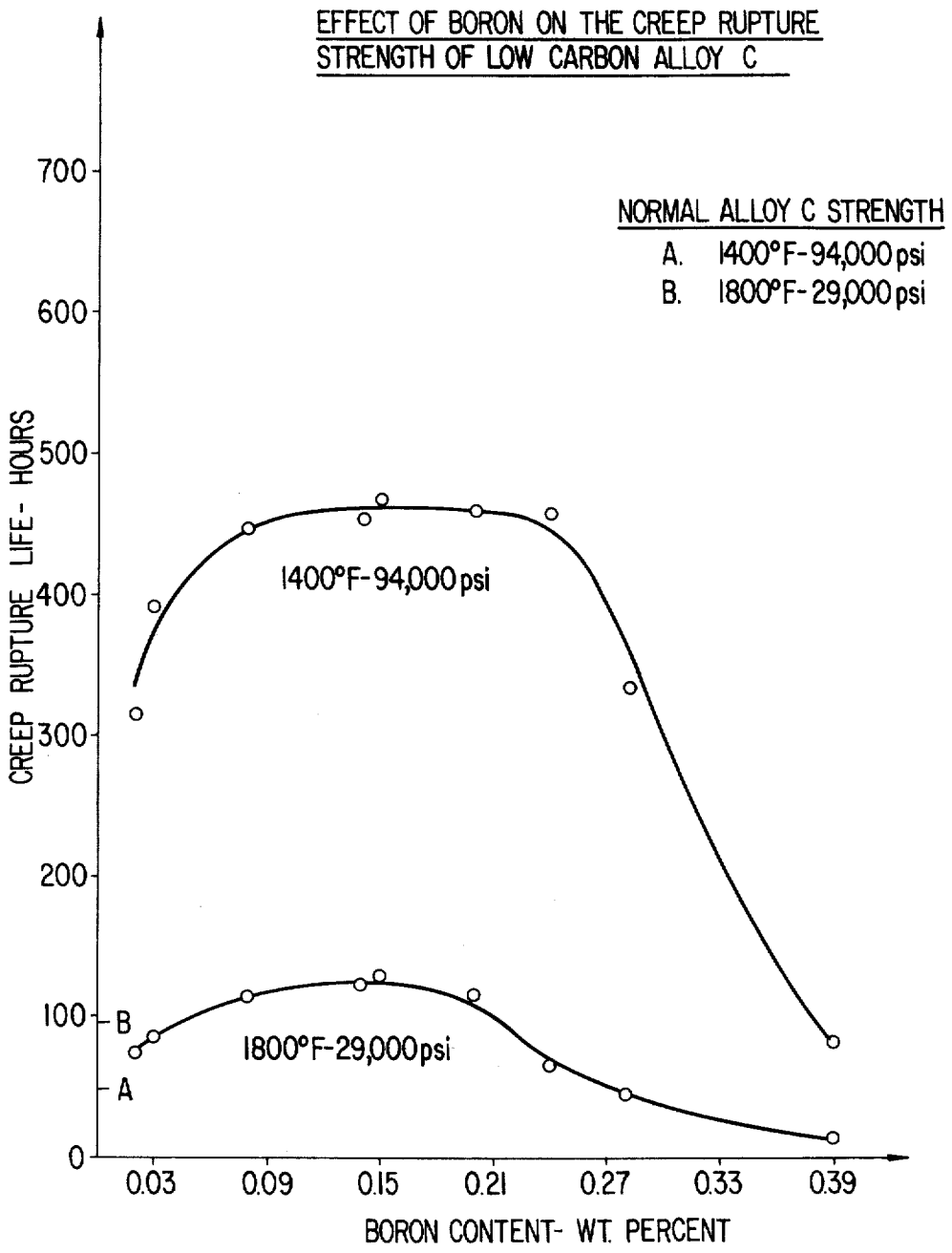
FIG. 2 is a plot of creep-rupture life in hours against the boron content in weight percent of certain nickel base alloys at both 1,400° F. — 94,000 psi and 1,800° F. — 29,000 psi. The creep-rupture life at 1,400° F — 94,000 psi and 1,800° F — 29,000 psi for commercial alloys similar to the alloy of the plot, but outside the ambit of the present invention, is also noted on the plot.
Figure 3:
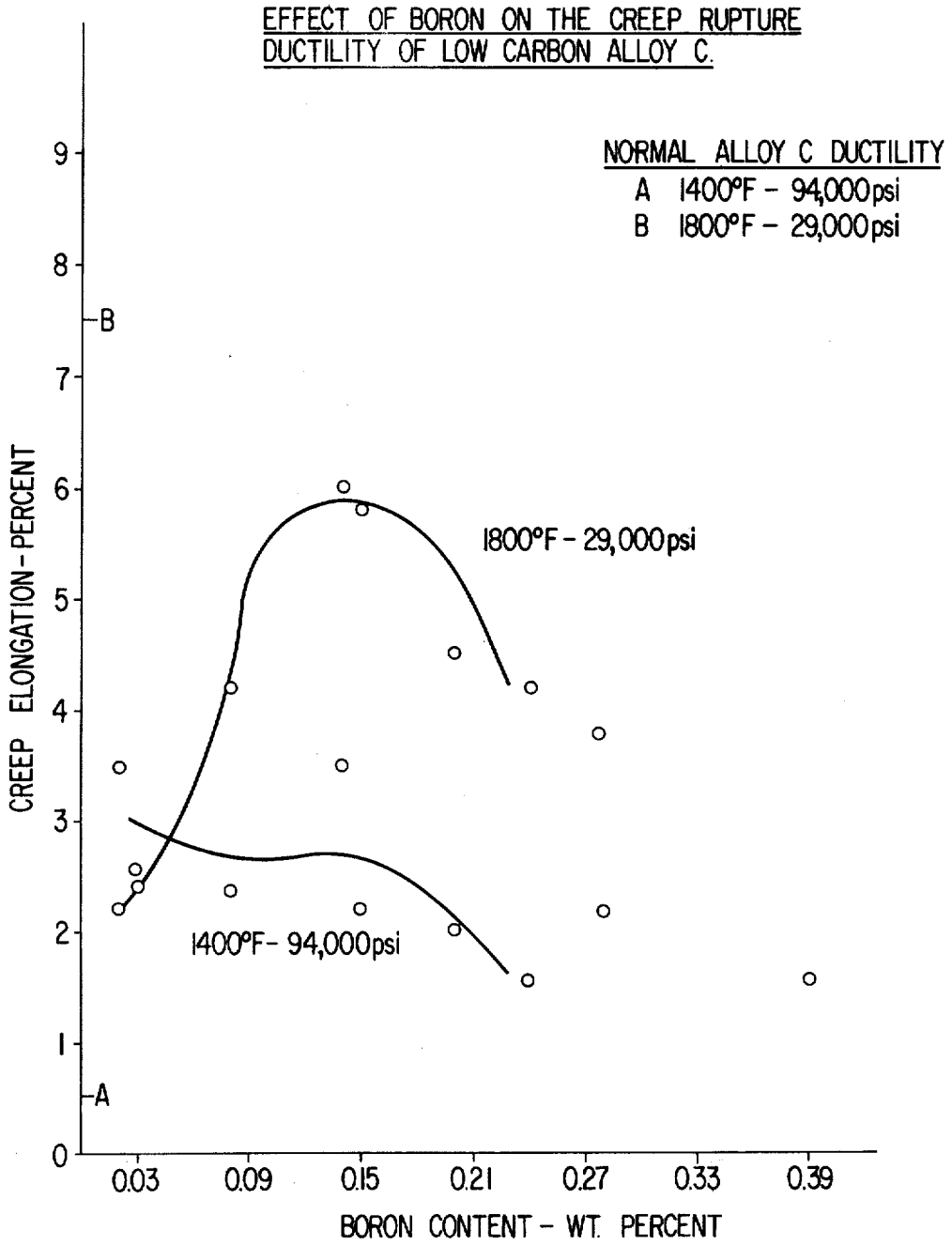
FIG. 3 is similar to FIG. 2 but plots percent creep elongation against boron content, rather than creep rupture life against boron content.

FIGS. 2 and 3 further demonstrate the critical relationship between boron content and strength and ductility. FIG. 2 is a plot of creep rupture life in hours against the boron content in weight percent of C series, low carbon (less than 0.05% by weight), alloys at both 1,400°F — 94,000 psi and 1,800°F — 29,000 psi. The creep rupture life for commercial alloy C at 1,400°F – 94,000 psi and 1,800°F — 29,000 psi for commercial alloy C is noted on the plot at, respectively, points A and B. As is apparent, substantial improvements in crees rupture life are obtained at 1,400°F by maintaining the boron content within the critical range of the present invention.

FIG. 3 is a plot of percent creep elongation against boron content for C series, low carbon alloys at both 1,400°F — 94,000 psi and 1,800°F — 29,000 psi. The percent creep elongation for commercial alloy C at both 1,400°F — 94,000 psi and 1,800°F — 29,000 psi is also noted on this plot, respectively, at points A and B. Again substantial improvements are apparent at 1,400°F. with respect to alloys containing boron within the critical range of the present invention. While the percent creep elongation obtained at 1,800°F with alloys within the ambit of the present invention is not as high as that of the commercial alloy, highly acceptable levels are achieved.

Figure 4:
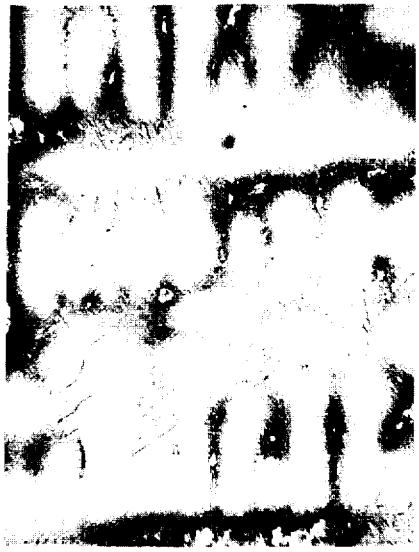
FIG. 4 is a reproduction of a photomicrograph at a magnification of 300, of a commercial alloy outside the ambit of the present invention.

Metallographic examination was conducted in an attempt to explain the mechanism responsible for the observed property enhancement. FIG. 4 shows the normal microstructure of commercial Alloy C in the as-cast condition at 300 magnifications. The light etching dendrite arms or branch-like areas indicate tungsten segregation. A few titanium rich carbides are visible in the lower center portion of the photomicrograph.

Figure 5:
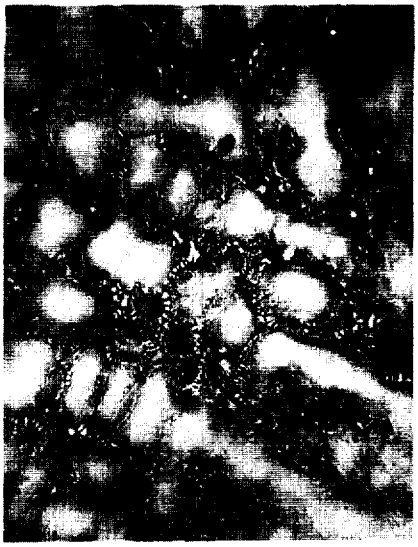
FIG. 5 is a reproduction of a photomicrograph, at a magnification of 300, of an alloy (comparable to the alloy of FIG. 4) within the ambit of the present invention.

The photomicrograph of FIG. 5 also at 300 magnifications, shows the profound microstructural change resulting from the added boron and reduced carbon of example alloy C-7. Reducing carbon to less than 0.02 weight percent frees titanium previously tied up as a stable carbide. The increased available titanium in the alloy results in the formation of gamma-gamma prime eutectic in the grain boundaries, a microstructural effect known to enhance 1,400°F ductility. The boron addition results in the formation of discrete grain boundary particles, identified by electron-beam micro-probe analysis as an $M_3B_2$ type boride where M (in the C alloy series) is chromium and tungsten. These grain boundary particles are responsible for restoring 1,800°F creep-rupture ductility to low carbon alloys.

Figure 6:
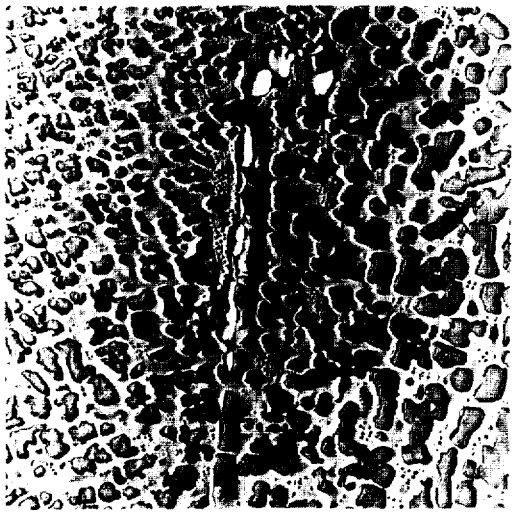
FIG. 6 is a reproduction of a photomicrograph, at a magnification of 7,000, of the same alloy shown in the photomicrograph of FIG. 4.
Figure 7:
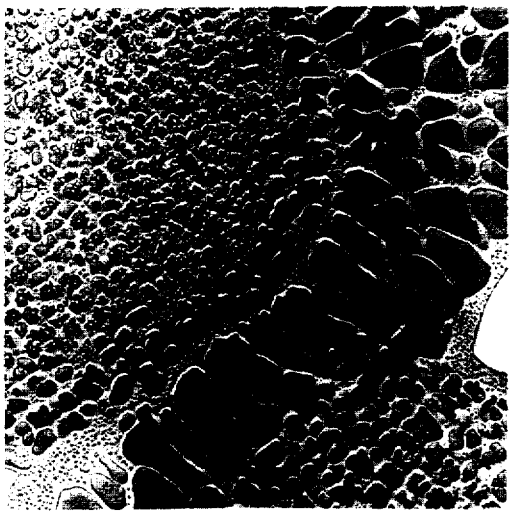
FIG. 7 is a reproduction of a photomicrograph, at a magnification of 7,000, of the same alloy shown in the photomicrograph of FIG. 5.

Electron photomicrographs of commercial alloy C and example alloy C-7, at 7,000 magnifications, are shown, respectively, in FIGS. 6 and 7. FIG. 6 shows, as previously stated to be the general case, borides located at the grain boundaries. In FIG. 7, a boride precipitate within each gamma prime particle may be observed, a phenomenon absent in superalloys of the more conventional compositions. The presence of the very fine boride particles appears to retard dislocation movement through the gamma-prime particles and, in essence, provides dispersion strengthening for improved resistance to creep deformation at 1,800°F. This microstructural effect has not been observed in commercial alloys.

Many of the alloys of the present invention may be extruded and hot forged. Wrought, high strength nickel-base superalloys are generally employed in applications where ductility and fracture roughness in the 1,000°F to 1,500°F temperature range are of prime concern. Such applications include gas turbine engine turbine and compressor disks. The series E alloys of the present invention may be hot forged, using conventional techniques, into shaped articles having the characteristics considered to be essential in advanced wrought alloys. For example, alloys E-1 and E-5 have responded very satisfactorily to extrusion and forging in the 2,000°F to 2,200°F temperature range in anticipation of the requirements for advanced wrought disk and blade materials.

The present invention also anticipates the use of powder metallurgy for controlling the size, morphology and distribution of the boride microconstituents previously described.

The invention in its broader aspects is not limited to the specific embodiments shown and described. Departures may be made therefrom within the scope of the accompanying claims without departing from the principles of the invention and without sacrificing its chief advantages.

What is claimed is:

[1. A nickel base alloy for use at relatively high temperatures consisting essentially of the following elements in the weight percent ranges set forth:

| Elements | Percent |
|---|---|
| Chromium | 5–22 |
| Aluminum | 0.2–8 |
| Titanium | 0.5–7 |
| Boron | 0.07–0.25 |
| Carbon | less than 0.05% |
| Cobalt | 0.00–20 |
| Columbium | 0.00–3 |
| Molybdenum | 0.00–8 |
| Tantalum | 0.00–10 |
| Vanadium | 0.00–2 |
| Tungsten | 0.00–20 |
| Rhenium | 0.00–2 |
| Zirconium | 0.00–1.00 |

the balance of the alloy being essentially nickel and minor amounts of impurities and incidental elements which do not detrimentally affect the basic characteristics of the alloy, said nickel being present in an amount of from about 35% to 85% by weight.]

[2. The nickel base alloy of claim 1 wherein the carbon content is no more than 0.025% by weight.]

[3. the nickel base alloy of claim 1 wherein the boron content is about 0.075% to 0.2% by weight.]

[4. A cast component for use in a gas turbine engine formed of the alloy of claim 1.]

[5. The component of claim 4 in which said component is a turbine blade.]

[6. The component of claim 4 in which said component is a disk.]

[7. The component of claim 4 in which said component is an integral wheel comprising a disk and turbine blade.]

[8. A cast component for use in a gas turbine engine formed of the alloy of claim 3.]

[9. The component of claim 8 wherein said component is a turbine blade.]

[10. The component of claim 8 wherein said component is a disk.]

[11. The component of claim 8 wherein said component is an integral wheel comprising a disk and turbine blade.]

12. A shaped object of the alloy of claim [1] *50* capable of withstanding an applied stress of 94,000 psi at 1,400°F. without rupture for a time in excess of 120 hours.

13. A shaped object of the alloy of claim [1] *12* capable of withstanding an applied stress of 29,000 psi at 1,800°F. without rupture for a time in excess of 40 hours.

14. The alloy of claim [1] *50* which contains, on a weight basis, about 6.0% to about 17% chromium, about 2% to about 8% aluminum, [about 0.75% to about 3% titanium, about 2% to about 17% cobalt,] and about 40% to 80% by weight nickel.

15. The nickel base alloy of claim 14 wherein the carbon content is no more than 0.025% by weight.

16. A cast component for use in a gas turbine engine formed of the alloy of claim 14.

17. A cast component for use in a gas turbine engine formed of the alloy of claim 15.

18. The alloy of claim [1] *50* which contains, on a weight basis, about 5% to 12% chromium, about 4% to about 8% aluminum, [about 0.75% to about 2.5% titanium,] about 5% to about 15.5% cobalt, and about 40% to 80% by weight nickel.

19. The nickel base alloy of claim 18 wherein the carbon content is no more than 0.025 by weight.

20. A cast component for use in a gas turbine engine formed of the alloy of claim 18.

21. A cast component for use in a gas turbine engine formed of the alloy of claim 19.

22. A nickel base alloy for use at relatively high temperatures consisting essentially of the following elements in the weight percent ranges set forth:

| Elements | Percent |
|---|---|
| Chromium | 6 - 17 |
| Aluminum | 2 - 8 |
| Titanium | 0.75 - 3 |
| Boron | 0.05 - 0.3 |
| Carbon | 0.00 - 0.05 |
| Cobalt | 2 - 17 |
| Columbium | 0.25 - 3 |
| Molybdenum | 0.00- 3 |
| Tantalum | 0.00 - 3 |
| Tungsten | 5 - 20 |
| Zirconium | 0.001 - 0.5 |

the balance of the alloy being essentially nickel and minor amounts of impurities and incidental elements which do not detrimentally affect the basic characteristics of the alloy, said nickel being present in an amount of from about 40% to 80% by weight.

23. The nickel base alloy of claim 22 wherein the boron content is about 0.07% to about 0.25% by weight.

24. The nickel base alloy of claim 22 wherein the carbon content is no more than 0.025 by weight.

25. A cast component for use in a gas turbine engine formed of the alloy of claim 22.

26. A cast component for use in gas turbine engine formed of the alloy of claim 24.

27. A nickel base alloy for use at relatively high temperatures consisting essentially of the following elements in the weight percent ranges set forth:

| Elements | Percent |
|---|---|
| Chromium | 8 - 10.25 |
| Aluminum | 4.75 - 5.5 |
| Titanium | 1 - 2.5 |
| Boron | 0.05 - 0.3 |
| Carbon | 0.00 - 0.05 |
| Cobalt | 8 - 12 |
| Columbium | 0.75 - 1.8 |
| Tungsten | 11 - 16 |
| Zirconium | 0.00 - 0.20 |

the balance of the alloy being essentially nickel and minor amounts of impurities and incidental elements which do not detrimentally affect the basic characteristics of the alloy.

28. The nickel base alloy of claim 27 wherein the boron content is about 0.07% to about 0.25% by weight.

29. The nickel base alloy of claim 27 wherein the carbon content is no more than 0.025% by weight.

30. A cast component for use in a gas turbine engine formed of the alloy of claim 27.

31. The component of claim 30 in which said component is a turbine blade.

32. A cast component for use in a gas turbine engine formed of the alloy of claim 29.

33. The component of claim 32 wherein said component is a turbine blade.

34. A shaped object of the alloy of claim 27 capable of withstanding an applied stress of 94,000 psi at 1,400° F. without rupture for a time in excess of 120 hours.

35. A shaped object of the alloy of claim 29 capable of withstanding an applied stress of 29,000 psi at 1,800° F. without rupture for a time in excess of 40 hours.

36. A nickel base alloy for use at relatively high temperatures consisting essentially of the following elements in the weight percent ranges set forth:

| Elements | Percent |
|---|---|
| Chromium | 5 - 12 |
| Aluminum | 4 - 8 |
| Titanium | 0.75 - 2.5 |
| Boron | 0.05 - 0.3 |
| Carbon | 0.00 - 0.05 |
| Cobalt | 5 - 15.5 |
| Columbium | 0.00 - 0.20 |
| Molybdenum | 3 - 8 |
| Tantalum | 2.3 - 10 |
| Tungsten | 0.00 - 2.5 |
| Zirconium | 0.00 - 1 |

the balance of the alloy being essentially nickel and minor amounts of impurities and incidental elements which do not detrimentally affect the basic characteristics of the alloy, said nickel being present in an amount of from about 40% to 80% by weight.

37. The nickel base alloy of claim 36 wherein the boron content is about 0.07% to about 0.25% by weight.

38. The nickel base alloy of claim 36 wherein the carbon content is no more than 0.025% by weight.

39. A cast component for use in a gas turbine engine formed of the alloy of claim 36.

40. A cast component for use in a gas turbine engine formed of the alloy of claim 38.

41. A nickel base alloy for use at relatively high temperatures consisting essentially of the following elements in the weight percent ranges set forth:

| Elements | Percent |
|---|---|
| Chromium | 7.5 - 8.5 |
| Aluminum | 5.75 - 6.25 |
| Titanium | 0.8 - 1.2 |
| Boron | 0.05 - 0.3 |
| Carbon | 0.00 - 0.05 |
| Cobalt | 9.5 - 10.5 |
| Molybdenum | 5.75 - 6.25 |
| Tantalum | 4.0 - 4.5 |
| Zirconium | 0.05 - 0.10 |

the balance of the alloy being essentially nickel and minor amounts of impurities and incidental elements which do not detrimentally affect the basic characteristics of the alloy.

42. The nickel base alloy of claim 41 wherein the boron content is about 0.07% to about 0.25% by weight.

43. The nickel base alloy of claim 41 wherein the carbon content is no more than 0.025% by weight.

44. A cast component for use in a gas turbine engine formed of the alloy of claim 41.

45. The component of claim 44 in which said component is a turbine blade.

46. A cast component for use in a gas turbine engine formed of the alloy of claim 43.

47. The component of claim 46 wherein said component is a turbine blade.

48. A shaped object of the alloy of claim 41 capable of withstanding an applied stress of 94,000 psi at 1,400° F. without rupture for a time in excess of 120 hours.

49. A shaped object of the alloy of claim 43 capable of withstanding an applied stress of 29,000 psi at 1,800° F. without rupture for a time in excess of 40 hours.

50. A nickel base alloy for use at relatively high temperatures consisting essentially of the following elements in the weight percent ranges set forth:

| ELEMENTS | PERCENT |
|---|---|
| Chromium | 5–22 |
| Aluminum | 0.2–8 |
| Titanium | 0.5–7 |
| Boron | 0.05–0.3 |
| Carbon | less than 0.05 |
| Cobalt | 2–17 |
| Columbium | 0.00–3 |
| Molybdenum | 0.00–8 |
| Tantalum | 0.00–10 |
| Vanadium | 0.00–2 |
| Tungsten | 0.00–20 |
| Rhenium | 0.00–2 |
| Zirconium | 0.00–1.00 |

the balance of the alloy being essentially nickel and minor amounts of impurities and incidental elements which do not detrimentally affect the basic characteristics of the alloy, said nickel being present in an amount of from about 35% to 85% by weight.

51. The nickel base alloy of claim 50 wherein the boron content is about 0.07% to about 0.25% by weight.

52. The nickel base alloy of claim 51 wherein the carbon content is no more than 0.025% by weight.

53. A cast component for use in a gas turbine engine formed of the alloy of claim 50.

*54. The nickel base alloy of claim 50 wherein the molybdenum content is 0.00 – 3% and the tungsten content is 5 – 20%.*

*55. The nickel base alloy of claim 50 wherein the molybdenum content is 3 – 8%, the tungsten content is < 2.5%, and the tantalum content is 2.3 – 10%.*

*56. The nickel base alloy of claim 50 wherein the cobalt content is 5 to 15.5% cobalt.*

*57. A nickel base alloy for use at relatively high temperatures consisting essentially of the following elements in the weight percent ranges set forth:*

| *Elements* | *Percent* |
|---|---|
| *Chromium* | *5–12* |
| *Aluminum* | *2–8* |
| *Titanium* | *0.5–7* |
| *Boron* | *0.05–0.3* |
| *Carbon* | *less than 0.05%* |

-continued

| *Elements* | *Percent* |
|---|---|
| *Cobalt* | *2–17* |
| *Columbium* | *0.00–3* |
| *Molybdenum* | *0.00–8* |
| *Tantalum* | *0.00–3* |
| *Vanadium* | *0.00–2* |
| *Tungsten* | *< 2.5* |
| *Rhenium* | *0.00–2* |
| *Zirconium* | *0.00–1.00* |

*the balance of the alloy being essentially nickel and minor amounts of impurities and incidental elements which do not detrimentally affect the basic characteristics of the alloy, said nickel being present in an amount of from about 35% to 85% by weight.*

*58. The nickel base alloy of claim 57 wherein the tungsten and vanadium contents are essentially 0.*

*59. A cast component for use in a gas turbine engine formed of the alloy of claim 57.*

*60. The nickel base alloy of claim 57 wherein the carbon content is no more than 0.025% by weight.*

*61. A nickel base alloy for use at relatively high temperatures consisting essentially of the following elements in the weight percent ranges set forth:*

| *Elements* | *Percent* |
|---|---|
| *Chromium* | *5–22* |
| *Aluminum* | *0.2–8* |
| *Titanium* | *0.5–7* |
| *Boron* | *0.05–0.3* |
| *Carbon* | *less than 0.05* |
| *Columbium* | *0.00–3* |
| *Cobalt* | *5–15.5* |
| *Molybdenum* | *< 3* |
| *Tantalum* | *0–10* |
| *Vanadium* | *0.00–2* |
| *Tungsten* | *0.00–20* |
| *Rhenium* | *0.00–2* |
| *Zirconium* | *0.00–1.00* |

*the balance of the alloy being essentially nickel and minor amounts of impurities and incidental elements which do not detrimentally affect the basic characteristics of the alloy, said nickel being present in an amount of from about 35% to 85% by weight.*

*62. The nickel base alloy of claim 61 wherein the carbon content is no more than 0.025% by weight.*

*63. The nickel base alloy of claim 61 wherein the chromium content is 5 – 12% and the tungsten content is 5 – 20%.*

*64. The alloy of claim 61, which contains, on a weight basis, about 2.3% to about 10% tantalum.*

*65. The alloy of claim 64 which contains, on a weight basis, 5–20% tungsten.*

*66. The alloy of claim 61, which contains, on a weight basis, less than 3% tantalum.*

*67. The alloy of claim 14 which contains, on a weight basis, 0 to about 3% molybdenum, 0 to about 3% tantalum, about 5% to about 20% tungsten, and about 0.001 to about 0.5% zirconium.*

*68. The alloy of claim 18, which contains, on a weight basis, about 3% to about 8% molybdenum, about 2.3% to about 10% tantalum, and 0 to about 2.5% tungsten.*

* * * * *